(12) United States Patent
Betouin et al.

(10) Patent No.: US 8,874,928 B2
(45) Date of Patent: Oct. 28, 2014

(54) SYSTEM AND METHOD FOR OBFUSCATING CONSTANTS IN A COMPUTER PROGRAM

(75) Inventors: Pierre Betouin, Boulogne (FR); Mathieu Ciet, Paris (FR); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1463 days.

(21) Appl. No.: 12/263,183

(22) Filed: Oct. 31, 2008

(65) Prior Publication Data

US 2010/0115287 A1 May 6, 2010

(51) Int. Cl.
- *G06F 11/30* (2006.01)
- *G06F 12/14* (2006.01)
- *G06F 21/12* (2013.01)
- *G06F 9/45* (2006.01)

(52) U.S. Cl.
CPC .............. *G06F 21/125* (2013.01); *G06F 8/41* (2013.01); *G06F 8/42* (2013.01); *G06F 8/433* (2013.01); *G06F 8/427* (2013.01); *G06F 8/434* (2013.01)
USPC .......................................... 713/189; 713/190

(58) Field of Classification Search
CPC ........... H04L 1/0014; G06F 8/41; G06F 8/42; G06F 8/427; G06F 8/433; G06F 8/434
See application file for complete search history.

(56) References Cited

U.S. PATENT DOCUMENTS

| | | | | |
|---|---|---|---|---|
| 5,276,881 A * | 1/1994 | Chan et al. | | 717/147 |
| 5,764,989 A * | 6/1998 | Gustafsson et al. | | 717/129 |
| 5,848,274 A * | 12/1998 | Hamby et al. | | 717/153 |
| 6,138,273 A * | 10/2000 | Sturges | | 717/114 |
| 6,192,282 B1 * | 2/2001 | Smith et al. | | 700/19 |
| 6,643,775 B1 * | 11/2003 | Granger et al. | | 713/190 |
| 6,972,612 B2 * | 12/2005 | Kang et al. | | 327/525 |
| 7,263,722 B1 * | 8/2007 | Luo et al. | | 726/26 |
| 7,620,987 B2 * | 11/2009 | Shelest et al. | | 726/22 |
| 7,861,304 B1 * | 12/2010 | Nachenberg et al. | | 726/24 |
| 2004/0187094 A1 * | 9/2004 | Gil et al. | | 717/116 |
| 2005/0183072 A1 * | 8/2005 | Horning et al. | | 717/140 |
| 2010/0106920 A1 * | 4/2010 | Anckaert et al. | | 711/154 |

* cited by examiner

*Primary Examiner* — Azizul Choudhury
(74) *Attorney, Agent, or Firm* — Novak Druce Connolly Bove + Quigg LLP

(57) ABSTRACT

Disclosed herein are systems, computer-implemented methods, and tangible computer-readable media for obfuscating constants in a binary. The method includes generating a table of constants, allocating an array in source code, compiling the source code to a binary, transforming the table of constants to match Pcode entries in an indirection table so that each constant in the table of constants can be fetched by an entry in the indirection table. A Pcode is a data representation of a set of instructions populating the indirection table with offsets toward the table of constants storing the indirection table in the allocated array in the compiled binary. The method further includes populating the indirection table with offsets equivalent to the table of constants, and storing the indirection table in the allocated array in the compiled binary. Constants can be of any data type. Constants can be one byte each or more than one byte each. In one aspect, the method further includes splitting constants into two or more segments, treating each segment as a separate constant when transforming the table of constants, and generating a function to retrieve and reconstruct the split constants.

20 Claims, 5 Drawing Sheets

SYSTEM AND METHOD FOR OBFUSCATING CONSTANTS IN A COMPUTER PROGRAM

BACKGROUND OF THE INVENTION

1. Field of the Invention

The present invention relates to obfuscation and more specifically to obfuscating constants in a compiled binary.

2. Introduction

Computer software is first written as source code which is readable by a person trained to understand programming languages. Generally a compiler converts that source code to object code that contains a list of instructions controlling what a computer does. Unfortunately for commercial software vendors who wish to enforce licensing or Digital Rights Management (DRM) provisions, or other software control schemes, malicious or mischievous individuals with enough time and resources can reverse engineer critical portions of the binary code. Reverse engineering allows for discovery of how a program operates. One technique to reverse engineer object code is to load the executable into memory and examine the memory contents with a piece of software called a debugger to locate the critical portions of software enforcing the restrictions or storing a particular value. Once the appropriate portions of binary code are located and reverse engineered, the software may be modified to perform in a manner not anticipated by the software vendor, potentially bypassing DRM or licensing restrictions, but also potentially causing great harm or injury. For example, a malicious reverse engineer could alter legitimate code to include a virus or could alter operating software for dangerous machinery to disregard safety protocols.

While it is impossible to design a software protection scheme that is invulnerable to reverse engineering, the goal is not to create an impenetrable barrier. The goal is to raise the cost of reverse engineering so high that the perceived cost of reverse engineering outweighs the expected benefit. Accordingly, what is needed in the art is an improved way to store and execute compiled software in a computing device while making the software difficult to reverse engineer and making needed constants difficult to extract from the binary.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learnt by the practice of the invention as set forth herein.

Disclosed are systems, computer-implemented methods, and tangible computer-readable media for obfuscating constants in a binary. The method includes generating a table of constants, allocating an array in source code, compiling the source code to a binary, generating the table of constants to match pcode entries in an indirection table so that each constant in the table of constants can be fetched by an entry in the indirection table. A pcode is a data representation of a set of instructions populating the indirection table with offsets toward the table of constants storing the indirection table in the allocated array in the compiled binary. The method further includes populating the indirection table with offsets equivalent to the table of constants and storing the indirection table in the allocated array in the compiled binary. Constants can be of any data type. Constants can be one byte each or more than one byte each. In one aspect, the method further includes splitting constants into two or more segments, treating each segment as a separate constant when transforming the table of constants, and generating a function to retrieve and reconstruct the split constants.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
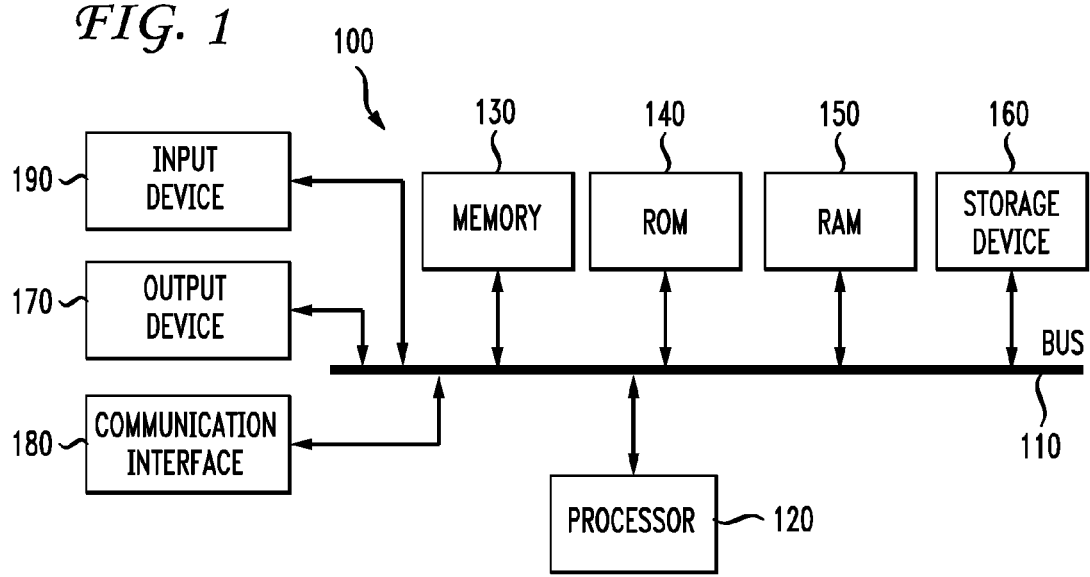
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

An opcode is a section of a computer instruction that indicates to a CPU an operation to be executed. Opcodes are typically highly CPU-specific. For example, opcodes associated with the x86 family of processors use a highly complex, variable length opcode scheme which operates by opcode expansion. Certain other CPUs use fixed length opcodes. Assembly languages allow a programmer to write code using mnemonics (such as MOV, JMP, SHR, and NOP) representing processor opcodes. A pcode is basically an opcode designed to execute on a software machine rather than a CPU directly. This approach can provide portability because the same pcode can execute on any CPU having an appropriate software machine. One example of a software machine is the Java Virtual Machine (JVM). JVM allows programmers to compile source code one time and run the code on any computing platform where JVM is available.

Figure 2:
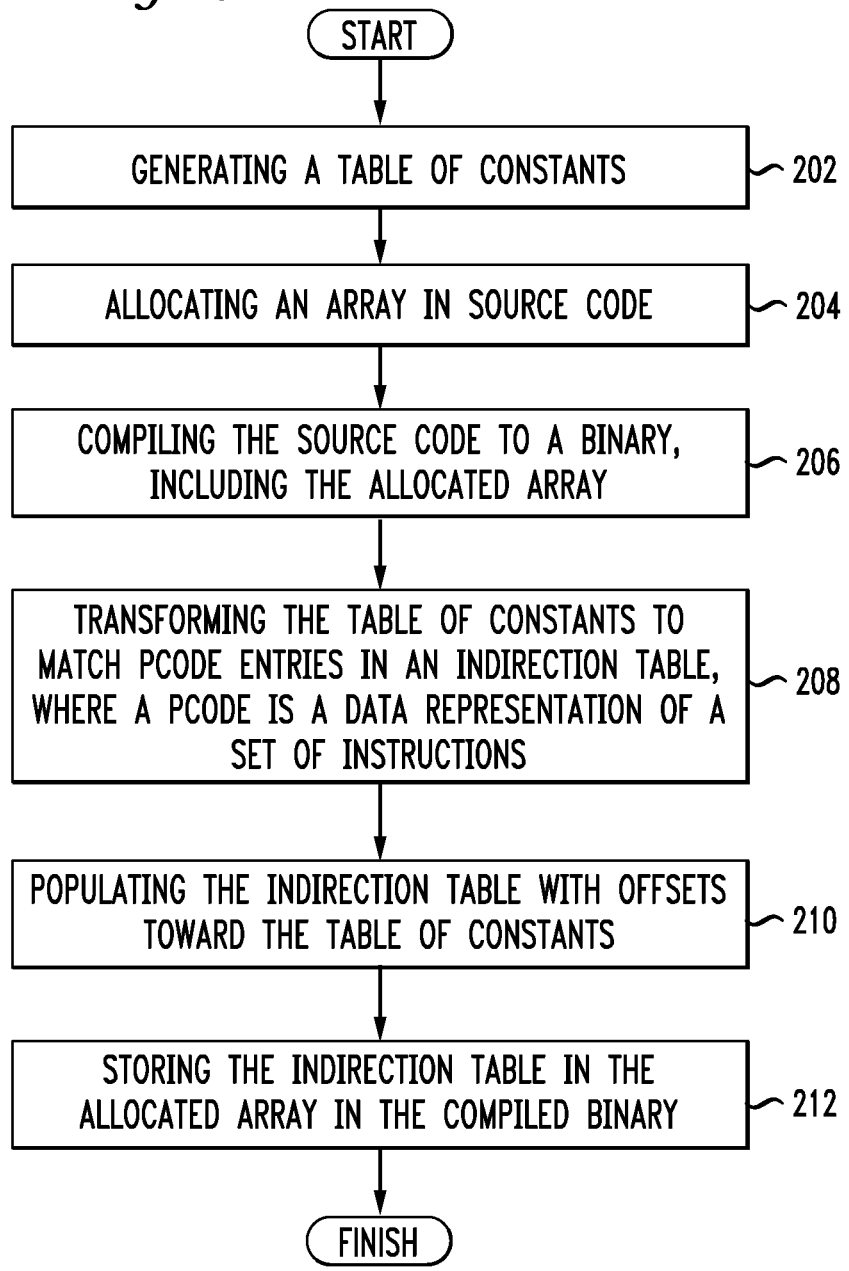
FIG. 2 illustrates an example method embodiment.

Having disclosed some fundamental system components, the disclosure turns to the exemplary method embodiment as shown in FIG. 2. For the sake of simplicity, the method of generating an obfuscated binary is discussed in terms of a system configured to practice the method. The system generates a table of constants (202). These constants are typically necessary for the software to function, but are not intended for direct use by a consumer. Some examples of constants include critical hashes, keys, and credentials. Constants can be of any data type, such as scalars, strings, or arrays. Constants can be of any bit length. In one example, if the system operates using a 32-bit processor, the pcode is coded in 32 bits. In this situation, if the system operates on 8-bit bytes, the system can apply a mask, or position tracker, to the bytes. In some cases, to further obfuscate constants, the system can split a constant into two or more segments, treat each segment as a separate constant when transforming the table of constants, and generate a function to retrieve and reconstruct the split constants.

The system generates the table of constants before compilation. As a consequence, the system knows in advance where to look in the table to fetch the value of the original constant. The system populates the pcode addresses in the constants table after compile-time after fetching the respective offsets into the binary. In one aspect, a programmer or an automated tool marks or annotates the constants in source code to be protected with the principles described herein. The system compiles the source code and fills the indirection table, possibly amending the indirection table if some constants are missing.

The system allocates an array in source code (204). The array will eventually store indirection table indexes for each original byte. The array can be marked at the beginning and/or end with a set of bits acting as a flag to indicate that it is the allocated array or the array can be filled with a recognizable pattern of bits signaling to a compiler that this array is reserved for later use. The system then compiles the source code to a binary, including the allocated array (206). The system transforms the table of constants to match pcode entries in an indirection table, where a pcode is a data representation of a set of instructions (208). Pcodes are instructions (code) stored with byte values. The system fetches a pcode equal to a desired constant. If this value is missing in the pcodes or if the instructions coding the value of our constant are missing, then the system can use a "missing pcode table". This table does not contain instructions, but instead, it contains direct values. In practice, this table should not happen since a common code usually contains all the desired values. The missing pcode table can contain multiple entries of the same missing pcode value.

The system populates the indirection table with offsets toward the table of constants (210) and stores the indirection table in the allocated array in the compiled binary (212). In one aspect, the system can apply and reapply the indirection principles described herein to achieve a threshold level of complexity or to achieve a desired balance of complexity and performance.

Figure 3:
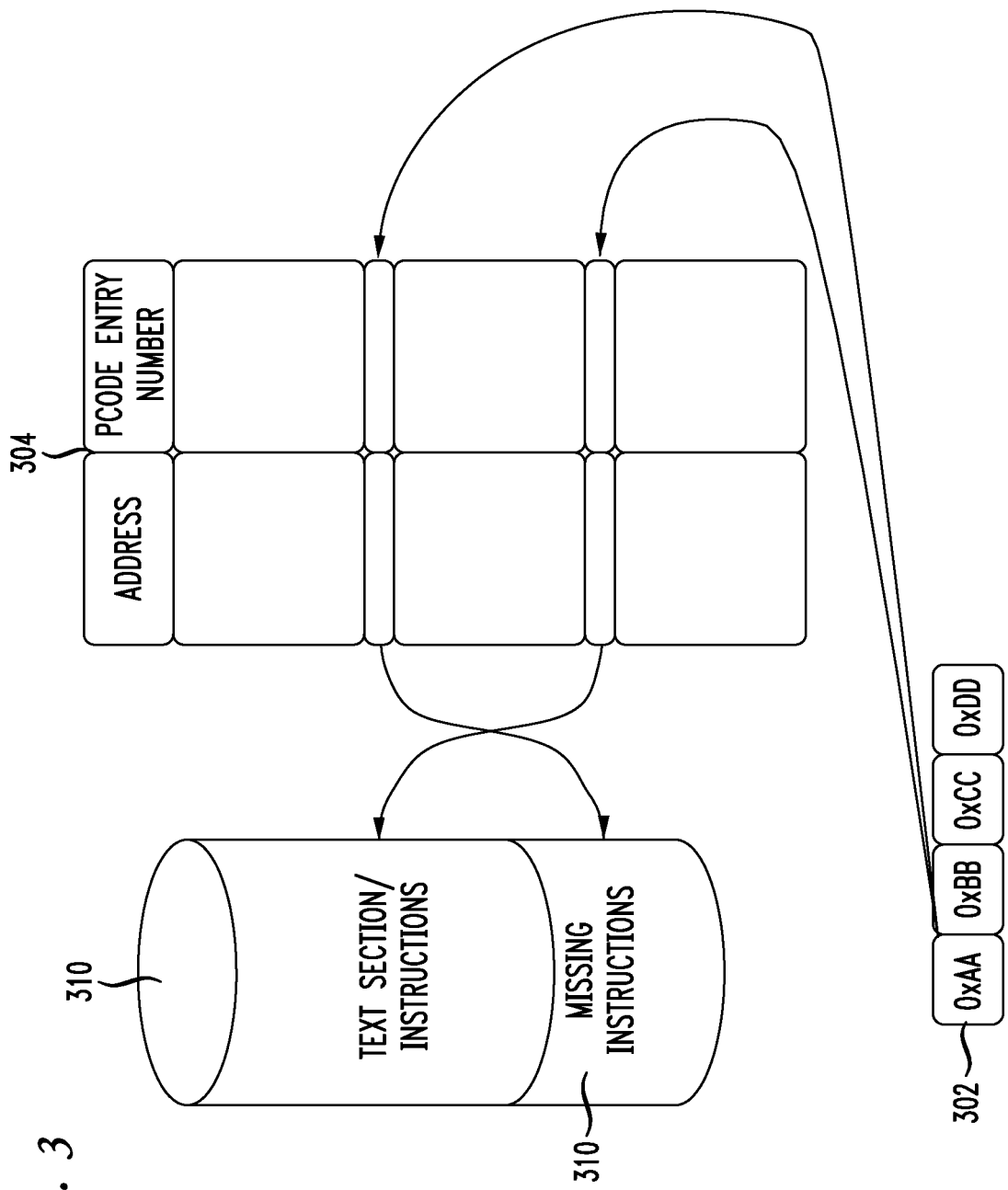
FIG. 3 illustrates an example of obfuscating constants.

FIG. 3 illustrates an example of obfuscating constants. The constants 302 are fixed values. The constants can be 4-bit nibbles, 8-bit bytes, 16-bit doubles, strings, or any other fixed value. The constants are shown in FIG. 3 as 0xAA, 0xBB, 0xCC, and 0xDD. During the obfuscation process, the system generates a table 304 linking pcodes entry numbers 308 and addresses 306 of instructions at compile time. Pcodes are data representations of a set of instructions. In this example, constant 0xAA is broken into two segments as indicated by the arrows pointing to different locations in the pcode entry number table. The same principle can be applied to longer or shorter constants. The system can split a constant into two or more smaller constants. Each processor has a set of available instructions to design implementations. The addresses 306 of instructions point into a text section or an instruction section 310. The instruction section can be one contiguous memory location or it can be split up in non-contiguous memory. The instruction section can include only those values found in the constants or it can be a table of every possible value for a given bit length. However, duplicate entries are also possible in the instruction section to further obfuscate the constants.

When the code references a constant located in the compiled binary as pcodes, the system replaces the constant with a reference to the indirection table for the correct pcode. Occasionally the code can reference a constant not in the compiled binary. In those cases, the system can add an extra table containing the missing bytes values.

During runtime the binary has no access to the original table. The binary has access to the same information as was stored in the original table but only using a non-common, obfuscated access method instead. If the constants are 8-bit bytes, $2^8$ (256) possibilities exist. The 256 bits can easily fit within an executable and/or within system memory. With so few possibilities, several constants can contain the same 8-bit sequences at different locations. In one embodiment, two equal constants link to two different locations in the table. In another embodiment, the system randomly chooses the link when it generates the link. While the system uses the original table or the constant in code to generate an indirection table, the system removes the original table or constant in the final executable.

The same principles can be extended to a set of values stored inside a table such as strings or arrays. Given a table A, each A[i] is treated as a separate constant similar to the 0xAA, 0xBB, 0xCC and 0xDD 302 in FIG. 3. If the constants are 16-bit, a very modest $2^{16}$ (65,536) possibilities exist, although multiple representations for the same constant can increase that size. The 65,536 bits can easily fit within a typical modern executable and/or within system memory of a relatively recent computer. Currently if the constants are 32-bits the number of possibilities are impractical because $2^{32}$ (4,294,967,296) possibilities exist for one representation of each possible constant value. However, using larger constant representations decreases the possibility of encountering different representations of the same constant. Multiple representations can provide a layer of security. A simple way to circumvent this issue is to subdivide a longer constant into individual bytes and apply the previous principle on these bytes. For example, the system can split a 4-byte-long double word (DWord) into 2 words or into 4 bytes. Splitting constants provides an additional advantage of extra complexity because the system must use an additional set of instructions or operations to reconstruct the constant. This added complexity is a form of obfuscation, hindering would-be reverse engineers, albeit at a possible performance decrease.

The principles discussed herein can be applied to constants in a binary in whole or in part. For example, the system can obfuscate certain critical constants with this technique in combination with other obfuscation, the system can obfuscate less critical constants with this technique alone, and the system can leave other, non-critical constants unmodified.

The system can also determine criticality based on a threshold or based on programmer-entered flags, for example. The system can allocate an identified buffer in the original source code. One way is to fill it with a well-known or predetermined bit pattern. The buffer can store the indirection table indexes for each original byte as shown above. The system can compile the code to generate a binary object using a standard, unmodified compiler. The system then makes an extra pass on the binary to populate the indirection table with the offsets toward the pcodes. Each data table can contain indexes of the indirection table.

Figure 4:
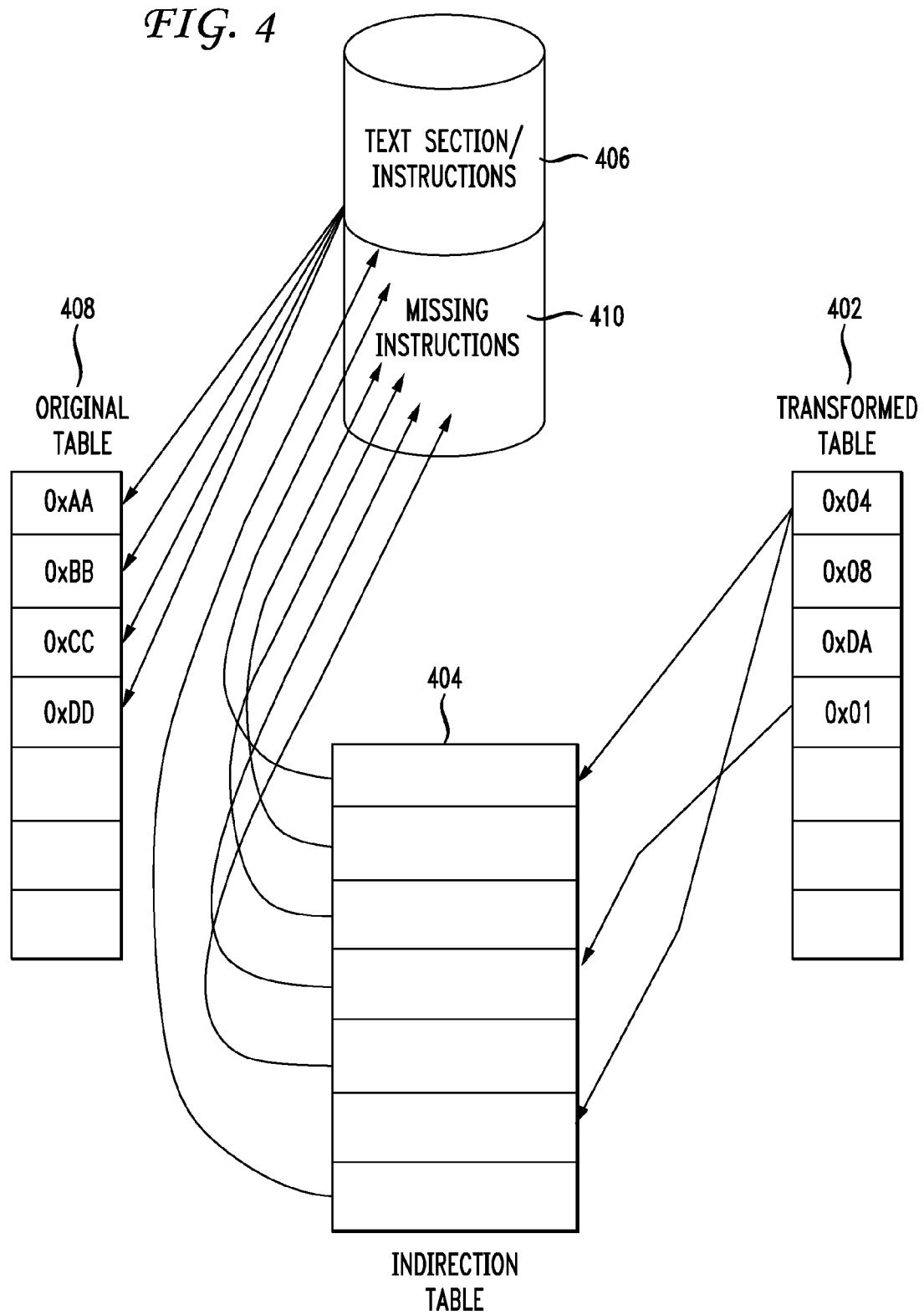
FIG. 4 illustrates an example of retrieving obfuscated constants.

FIG. 4 illustrates an example of retrieving obfuscated constants. Obfuscated values are not accessible directly. The system must first look up the correct entry in a transformed table 402 which substitutes for the original constants. The transformed table provides addresses into an indirection table 404 as shown in further detail as 304 in FIG. 3. The indirection table converts transformed table references into addresses into the text section/instructions 406. The text section (or instructions) contains the equivalent of the desired values in the original table 408. One basic principle of this invention is the use of indirection tables. The system can replicate indirection tables multiple times in an attempt to thwart or hinder a would-be reverse engineer. Software commonly uses constants and tables of fixed values. Often software authors desire to protect these constants against reverse engineering, especially in the field of DRM-related software but also in other fields. The principles described herein can be applied in two ways. First, the process can be applied to masked data. Second, the process can be applied to the masking of the process. Further, the process can apply to constants inside code as well as data stored in a table.

Figure 5:
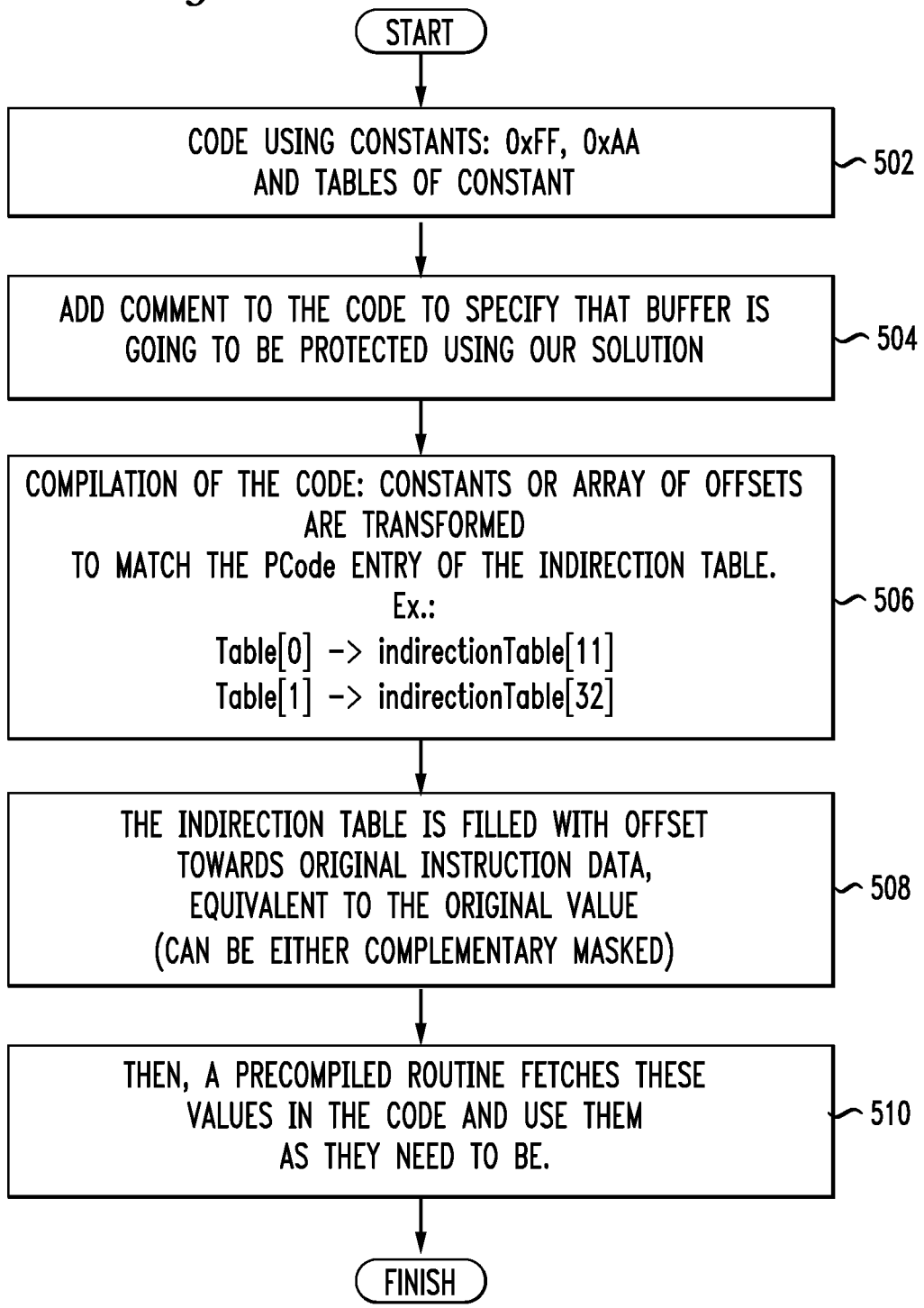
FIG. 5 illustrates a process flow for a tool to generate a binary according to the method.

FIG. 5 illustrates a process flow for a tool to generate a binary according to the method. First, the tool accepts as code using individual constants or tables of constants 502. The tool adds comments to the code to specify that a buffered section will be protected 504. During the compilation of the code, the tool transforms constants or the array of offsets to match pcode entries in the indirection table 506. For example, the tool can convert entries in the original table such as Table[0] and Table[1] to entries in an indirection table such as indirectionTable[11] and indirectionTable[32]. The tool fills the indirection table with offset towards original instruction data equivalent to the original value 508. The tool can obscure the values in the indirection table using a complementary or a masked approach. Then, the tool uses a precompiled routine to fetch these values in the code and use them as needed by the binary 510.

The principles described herein are not only an alternative to other obfuscation techniques, but can be combined with other obfuscation techniques to provide additional layers of complexity and confusion for classical reverse engineering attempts.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium.

Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to any software program which must be resistant to reverse engineering. The principles herein can be combined with nearly any other obfuscation, encryption, or software security scheme. Those skilled in the art will readily recognize various modifications and changes that may be made to the present invention without following the example embodiments and applications illustrated and described herein, and without departing from the true spirit and scope of the present invention.

We claim:

1. A method comprising:
generating, via a processor, a table of constants;
compiling source code to produce a compiled binary having an array and compiled constants, each constant in the table of constants corresponding to a compiled constant;
constructing an indirection table, wherein each entry contains a first reference to a data representation of a set of instructions in the compiled binary that is equivalent to a compiled constant corresponding to a constant in the table of constants;
removing from the compiled binary each compiled constant corresponding to a constant in the table of constants by replacing, in the compiled binary, each compiled constant corresponding to a constant in the table of constants with a respective second reference to an entry in the indirection table that is equivalent to the compiled constant; and
storing the indirection table in the array in the compiled binary.

2. The method of claim 1, wherein constants can be of any data type.

3. The method of claim 1, the method further comprising:
splitting constants into two or more segments;
treating each segment as a separate constant; and
generating instructions to retrieve and reconstruct the split constants.

4. The method of claim 1, wherein bits in the table of constants are masked.

5. The method of claim 1, wherein bits in the table of constants are complementary.

6. The method of claim 1, the method further comprising adding a missing instructions table containing at least one missing byte value if the compiled binary does not contain at least one data representation of a set of instructions equivalent to a compiled constant corresponding to a constant in the table of constants.

7. The method of claim 1, the method further comprising applying a position tracker when the data representations of a set of instructions and the constants are different sizes of bits.

8. A system comprising:
a processor;
a memory storing instructions for controlling the processor to perform steps comprising:
generating a table of constants;
compiling source code to produce a compiled binary having an array and compiled constants, each constant in the table of constants corresponding to a compiled constant;
constructing an indirection table, wherein each entry contains a first reference to a data representation of a set of instruction in the compiled binary that is equivalent to a compiled constant corresponding to a constant in the table of constants;
removing from the compiled binary each compiled constant corresponding to a constant in the table of constants by replacing, in the compiled binary, each compiled constant corresponding to a constant in the table of constants with a respective second reference to an entry in the indirection table that is equivalent to the compiled constant; and
storing the indirection table in the array in the compiled binary.

9. The system of claim 8, wherein constants can be of any data type.

10. The system of claim 8, the steps further comprising:
splitting constants into two or more segments;
treating each segment as a separate constant; and
generating instructions to retrieve and reconstruct the split constants.

11. The system of claim 8, wherein bits in the table of constants are masked.

12. The system of claim 8, wherein bits in the table of constants are complementary.

13. The system of claim 8, the steps further comprising adding a missing instructions table containing at least one missing byte value if the compiled binary does not contain at least one data representation of a set of instructions equivalent to a compiled constant corresponding to a constant in the table of constants.

14. The system of claim 8, the steps further comprising applying a position tracker when the data representations of a set of instructions and the constants are different sizes of bits.

15. A non-transitory computer-readable storage medium storing instructions which, when executed by a computing device, cause the computing device to perform steps comprising:

generating a table of constants;

compiling source code to produce a compiled binary having an array and compiled constants, each constant in the table of constants corresponding to a compiled constant;

constructing an indirection table, wherein each entry contains a first reference to a data representation of a set of instructions in the compiled binary that is equivalent to a compiled constant corresponding to a constant in the table of constants;

removing from the complied binary each compiled constant corresponding to a constant in the table of constants by replacing, in the compiled binary, each compiled constant corresponding to a constant in the table of constants with a respective second reference to an entry in the indirection table that is equivalent to the compiled constant; and storing the indirection table in the array in the compiled binary.

16. The non-transitory computer-readable storage medium of claim 15, wherein constants can be of any data type.

17. The non-transitory computer-readable storage medium of claim 15, the instructions further comprising:

splitting constants into two or more segments;

treating each segment as a separate; and generating instructions to retrieve and reconstruct the split constants.

18. The non-transitory computer-readable storage medium of claim 15, wherein bits in the table of constants are masked.

19. The non-transitory computer-readable storage medium of claim 15, wherein bits in the table of constants are complementary.

20. The non-transitory computer-readable storage medium of claim 15, the instructions further comprising adding a missing instructions table containing at least one missing byte value if the compiled binary does not contain at least one data representation of a set of instructions equivalent to a compiled constant corresponding to a constant in the table of constants.

* * * * *